(12) United States Patent
Saito et al.

(10) Patent No.: US 7,123,487 B2
(45) Date of Patent: Oct. 17, 2006

(54) CARD INTERFACE DEVICE

(75) Inventors: Masaaki Saito, Tokyo (JP); Kei Takahashi, Kanagawa (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 406 days.

(21) Appl. No.: 10/448,388

(22) Filed: May 30, 2003

(65) Prior Publication Data

US 2003/0227805 A1 Dec. 11, 2003

(30) Foreign Application Priority Data

Jun. 5, 2002 (JP) .............................. 2002-164174

(51) Int. Cl.
*H05K 7/14* (2006.01)
*H05K 7/18* (2006.01)

(52) U.S. Cl. ...................... 361/801; 361/802; 361/726; 361/759

(58) Field of Classification Search ........ 361/801–802, 361/752, 790, 797, 800, 759, 740, 726, 732, 361/747
See application file for complete search history.

(56) References Cited

U.S. PATENT DOCUMENTS

| | | | | |
|---|---|---|---|---|
| 5,574,625 A | * | 11/1996 | Ohgami et al. | ............. 361/684 |
| 5,738,537 A | * | 4/1998 | Setoguchi et al. | .......... 439/159 |
| 5,969,319 A | * | 10/1999 | Wallner | ....................... 235/380 |
| 6,570,757 B1 | * | 5/2003 | DiFonzo et al. | ............ 361/683 |
| 6,651,881 B1 | * | 11/2003 | Choiset | ....................... 235/380 |
| 6,674,639 B1 | * | 1/2004 | Wang et al. | ................. 361/683 |

FOREIGN PATENT DOCUMENTS

JP 04-137594 A1 5/1992

* cited by examiner

*Primary Examiner*—Randy W. Gibson
*Assistant Examiner*—Hung S. Bui
(74) *Attorney, Agent, or Firm*—Rader, Fishman & Grauer PLLC (57) ABSTRACT

In a structure where the lid portion is mounted on the main housing body comprising apertures and in such a manner as to turn freely thereon, the concave lock portion and the locking protrusion adjacent thereto capable of locking the lid in the closed state are located in the aperture side of the main housing body. The lid portion is provided with the hooking piece comprising the spring portion and the arc-shaped protrusion. When the lid portion turns to open or close the aperture portion, the arc-shaped protrusion comes into contact with the locking protrusion under pressure with the spring portion, in order that a force opposing to the turning direction may be applied thereto before and after it passes through the locking protrusion, to keep the lid portion in two states i.e. the open state and the closed state.

10 Claims, 6 Drawing Sheets

CARD INTERFACE DEVICE

CROSS-REFERENCES TO RELATED APPLICATIONS

This application is based upon and claims the benefit of priority from the prior Japanese Patent Application No. 2002-164174, filed on Jun. 5, 2002.

BACKGROUND OF THE INVENTION

1. Field of the Invention

The present invention relates to a card interface device comprising a housing having a switching function on a lid.

2. Related Art

It has been required that input and output of a card interface device or a control device thereof can be turned on or off in accordance with open or close of a lid thereof, thereby to prevent the apparatus from being damaged and to improve reliability thereof. In a structure where a card is inserted into, for example, an input/output terminal of an interface of a personal computer or a loading slot for a memory card of a portable terminal or a digital camera, it is necessary that operation should be carried out under the condition that the card is inserted therein and is completely into contact with the contact point of the device. If the contact is not perfect, the device and the card may be damaged or may not function properly.

A structure having a lid provided at a loading slot for a card has been considered to solve the problem mentioned above, thereby certifying the state of insertion of the card by opening or closing the lid and then making the device operate by turning on a switch of a power supply, etc. when the lid is closed. For instance, the lid is pivotally mounted on the loading slot of the housing accommodating an electronic circuit, and a cam connected to the turning axis of the lid turns on or off the switch located adjacent thereto.

However, the turning axis of the lid has to be very small and the cam also becomes small in this structure for a miniaturized device, so that the axis and the cam driving the switch may become strained and result in lack of durability. Furthermore, instability such as turning on or adversely turning off of the switch may take place when the lid is not completely closed. To avoid the trouble described above, a structure that makes switch operation assured by applying a reverse torque to the direction of opening or closing of the lid (it means the circulation in regular or reverse direction) bounded by a certain turning position has been expected.

The present invention is intended to overcome such inconvenience and to provide a card interface device that can comprise a housing with a lid ensuring high durability and accomplishing reliable switching operation at a low cost.

BRIEF SUMMARY OF THE INVENTION

Some aspects of the present invention are as follows:
(1) A card interface device comprising:
  a main housing body having an opening portion,
  a lid portion mounted on the main housing body in such a manner as to turn freely thereon to open or close the, opening portion,
  a concave lock portion and a locking protrusion located adjacent to the concave lock portion, both of which are provided on the side of the opening portion of the main housing body in order to be able to lock the lid, portion in the closed state, and
  a hooking piece provided on the lid portion and comprising a spring portion and an arc-shaped protrusion,
  wherein the arc-shaped protrusion comes into contact with the locking protrusion under pressure by the aid of the spring portion when the lid portion is turning to open or close the opening portion, and receives a force opposing the turning direction before and after it passes through the locking protrusion.

(2) A card interface device comprising:
  a main housing body having at least one card loading portion at the front part thereof and accommodating therein a circuit board containing a switch, and forming an aperture for the switch through which the switch is exposed,
  a lid portion mounted on the main housing body in such a manner as to turn freely thereon to open or close the card loading portion,
  a concave lock portion and a locking protrusion located adjacent to the concave lock portion, both of which are provided on the side of the card loading portion of the main housing body in order to be able to lock the lid portion in the closed state,
  a hooking piece provided on the lid portion and comprising a spring portion and an arc-shaped protrusion, and
  a switch pressing member provided at the side of the lid portion facing the aperture for the switch of the main housing body corresponding to the aperture for the switch,
  wherein the arc-shaped protrusion comes into contact with the locking protrusion under pressure by the aid of the spring portion when the lid portion is turning to open or close the opening portion, and receives a force opposing the turning direction before and after it passes through the locking protrusion, and the switch pressing member presses the switch by being inserted into the aperture for the switch when the lid is closed.

(3) The card interface device in which the curvature of the locking protrusion is greater than the curvature of the arc-shaped protrusion.

(4) The card interface device in which the hooking piece is integrally formed on the rear surface of the top surface portion of the lid portion.

(5) The card interface device in which the hooking piece is formed on the front edge part of the lid portion.

(6) The card interface device in which the curvature of the concave lock portion is approximately the same as the curvature of the arc-shaped protrusion.

(7) The card interface device in which the switch pressing member, the concave lock portion and the locking protrusion are all together positioned offset on the same side of the lid portion.

(8) The card interface device in which two card loading portions are located side by side to each other.

DETAILED DESCRIPTION OF THE INVENTION

FIRST EMBODIMENT

FIG. 1 to FIG. 5 show the first embodiment of the present invention.

Figure 1:
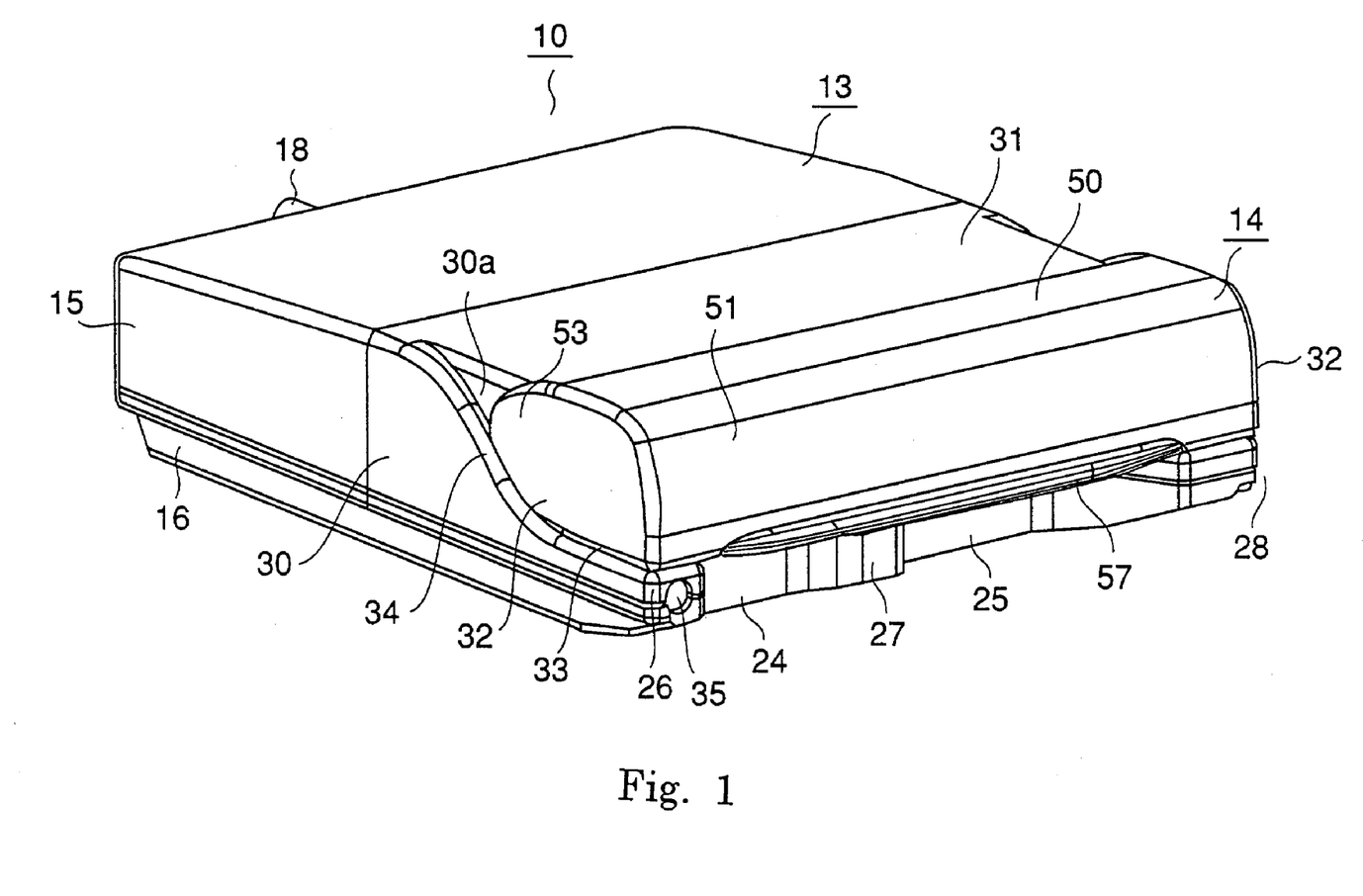
FIG. 1 is a perspective view of the first embodiment of the present invention in the closed lid state.
Figure 2:
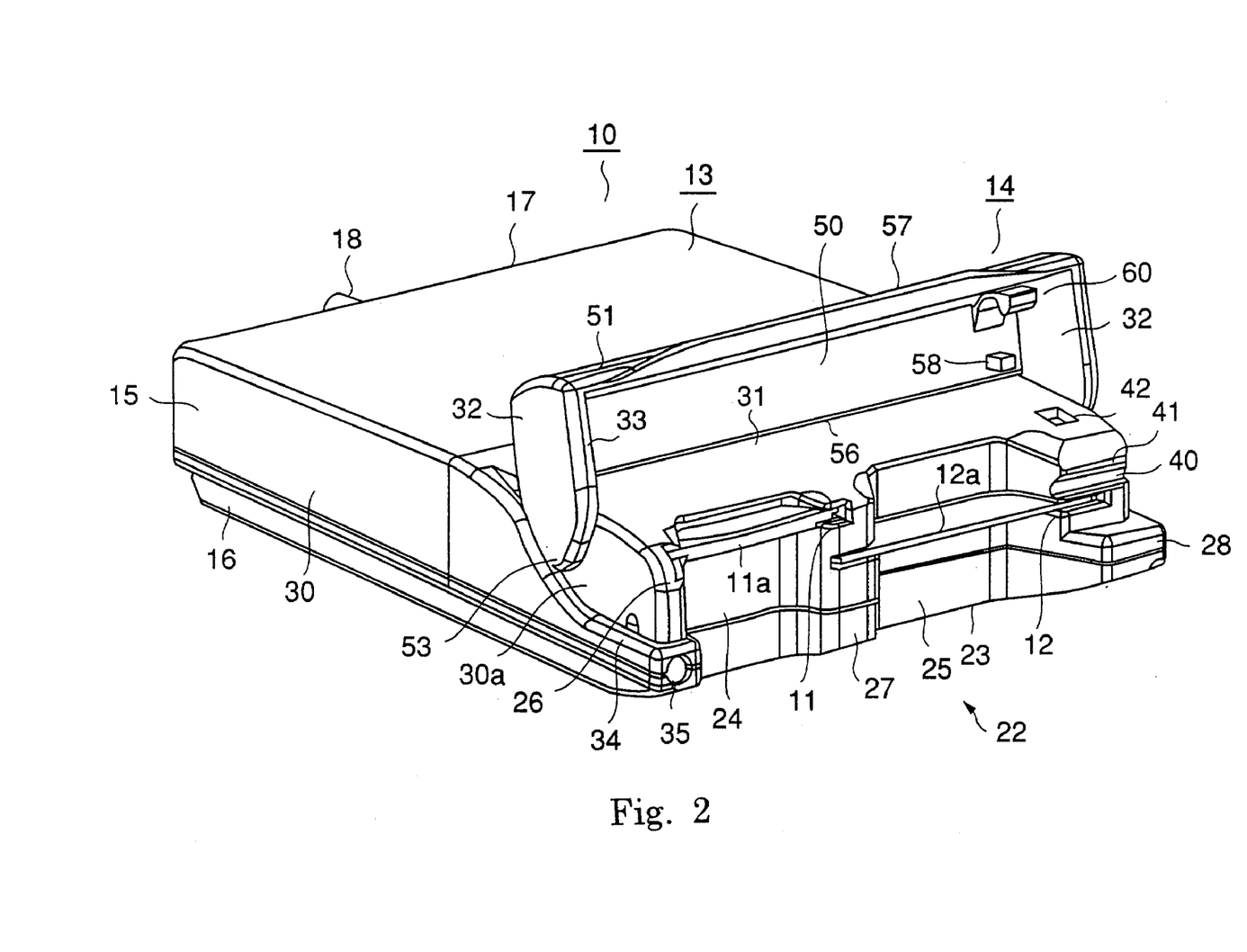
FIG. 2 is a perspective view of the first embodiment of the present invention in the open lid state.

This embodiment is applied to a card interface device, which is connected to an electronic device such as an information terminal or a digital camera, to read and write a small-sized memory card. The small-sized memory card has a variety of standards that have different outlines and different terminals, for example Smart Media (trade name) or Compact Flash (trade name). Therefore, interfaces corresponding to plural types of cards are necessary. An apparatus 10 of this embodiment has a construction comprising card-loading slots (opening portions) 11 and 12 into which different types of memory cards 11a and 12a are inserted respectively, and being connected to a main body such as a computer via a connector, such as USB (Universal Serial Bus).

Figure 4A:
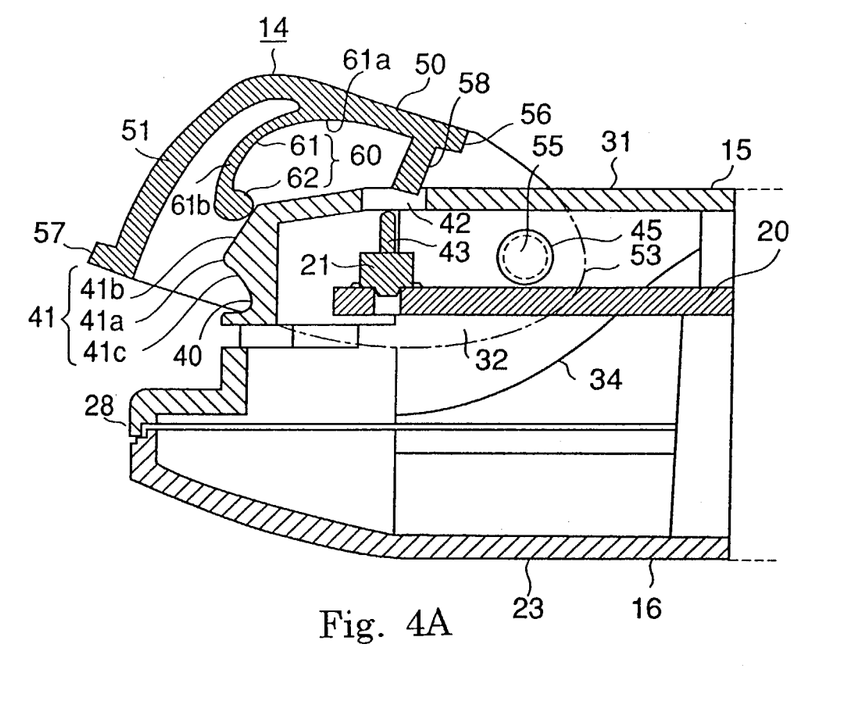
FIG. 4A is a partial cross section in the open lid state to explain an embodiment of the present invention and FIG. 4B is a partial cross section in the closed lid state to explain an embodiment of the present invention.
Figure 4B:
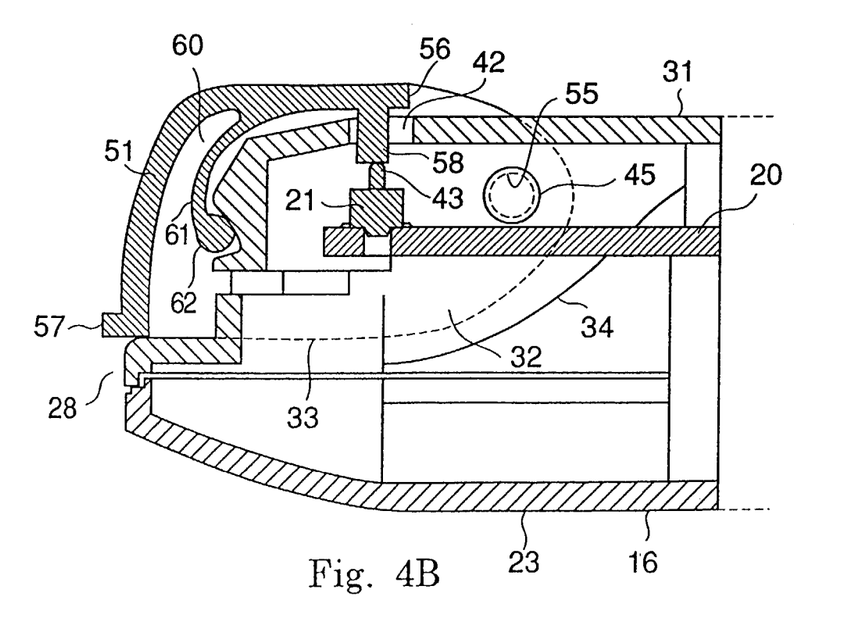

The card interface device 10 comprises a housing portion 13 accommodating a main body and a lid portion 14 opening or closing about the housing portion. The housing portion is constructed by combining a flat top housing 15 and a bottom housing 16, both of which are of resin mold. As shown in FIGS. 4A and 4B, the main body contains a circuit board 20, a power switch 21 mounted on the circuit board, a semiconductor circuit including an IC, and a terminal for connecting a card (not shown). The circuit board is located between the top housing 15 and the bottom housing 16 substantially in parallel therewith. A cord 18 with a USB connector at the end thereof is elongated from the rear edge side 17 of the housing portion 13, to be able to connect to a computer or a digital camera.

On the front part 22 of the housing portion, memory card loading slots 11 and 12 corresponding to two kinds of cards are located at a different height from the bottom 23 of the housing and also shifted horizontally to each other. To facilitate insertion of cards, recesses 24 and 25, which make easy for an operator to pinch a card with his/her fingers and thumb, are formed at the front part near the center of each slot. Thus projecting parts 26, 27, and 28 are to be formed on the front part 22, interposing the two recesses 24 and 25, or intervening between them.

The lid portion 14 is located on the front part of the top housing 15. Therefore, the projecting parts 26, 27, and 28, both side ends 30, and the top surface portion 31 of the front part are retracted from the outline of the main housing body by approximately the thickness of the lid portion 14, in order that the lid portion may not stick out from the main housing body 13 when the lid is in the closed state, thereby the lid portion 14 is substantially on the same plane as the housing portion 13 to be able to assure a smooth outline when the lid is in the closed state. A contact edge 34 with which the lower edge 33 of the side end 32 of the lid portion comes into contact is formed on the retracted side end 30a of the top housing 15, in order to settle the position of the lid portion when the lid is closed. A through hole 35 is formed under the left side projecting part 26 on the front part 22of the housing portion, and a light-emitting element (not shown) emitting a light when the power is on and the card is working is located in the through hole.

A concave lock portion 40 and a locking protrusion 41 are formed on the right side projecting part 28 on the front part 22 of the housing portion. An aperture 42 for the switch is formed on the top surface portion 31 of the top housing slightly behind the projecting part 28, and a push button 43 for the power switch 21 of the main body is located inside the aperture.

Figure 3:
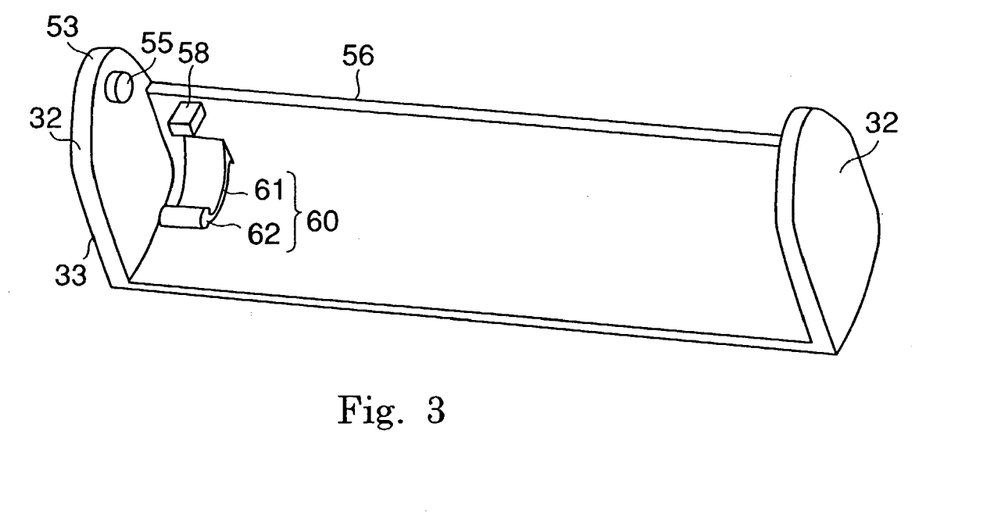
FIG. 3 is a perspective view of the lid in the first embodiment of the present invention seen from the rear surface side.

The lid portion 14 is provided with lid side end portions 32 on the top surface portion 50, the front end portion 51 on the side of the front part 22 of the housing portion, and both side edges thereof. The lid side end portion 32 is elongated backward more than the edge 56 of the top surface 50 thereof, and an axial protrusion 55 is projecting inside the rear end of the lid end 53 i.e. each lid side end portion. A through-hole socket 45 (referred to FIGS. 4A and 4B) is formed in the retracted side end 30a of the top housing. The lid portion 14 is pivotally mounted on the housing portion 13 in such a manner as to turn freely thereon, by inserting the axial protrusion 55 into the through-hole socket. The turning range of the lid portion 14 is up to the position where the rear edge 56 of the top surface 50 of the lid portion comes into contact with the top surface 31 of the housing portion when the lid is open (FIG. 4A), and up to the position where the lower edge 33 of the lid side end 32 comes into contact with the contact edge 34 of the top housing when the lid is closed (FIG. 4B). A tongue flap 57 is formed on the lower surface of the front end part of the lid portion for operation of opening or closing the lid.

A hooking piece 60 of resin mold formed integrally with the lid portion 14 and a switch pressing member 58 of a rectangular pole located at a position on the rear edge side of the top surface 50 of the lid portion when one views it at the position of the hooking piece are provided on the back surface of the top surface 50 on the right side of the lid portion, viewed from the front part 22 of the housing. The hooking piece 60 comprises a leaf spring portion 61 warping arcuately toward the front part and an arc-shaped protrusion 62 provided on the top thereof. The switch pressing member 58 is inserted into the aperture 42 for the switch in the upper surface 50 of the top housing when the lid is in the closed state, and presses the push button 43 of the power switch 21.

Figure 5:
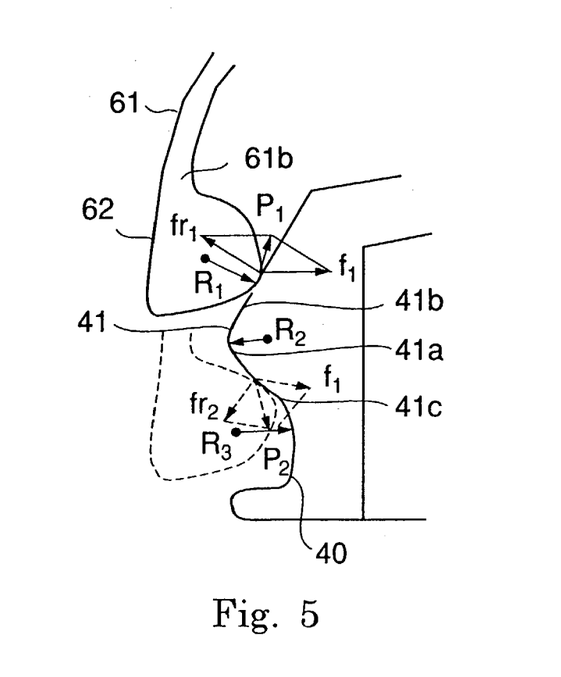
FIG. 5 is a schematic diagram explaining operation of the first embodiment of the present invention.

The hooking piece 60, the concave lock portion 40 and the locking protrusion 41, the latter two of them being on the front part of the housing and opposing the former, will be explained hereinafter by referring to FIG. 3 to FIG. 5.

The leaf spring portion 61 has a certain width, and one end 61a thereof is directly fixed to the back surface of the top surface 50 of the lid. The other end 61b thereof has the arc-shaped protrusion 62 with a predetermined curvature radius R1 protruded inward to the front surface. R1, R2, and R3 in the figure represent the curvature radii respectively. The locking protrusion 41 is formed on the projecting part 28 of the front part 22 of the housing, having a structure in which a portion of triangle pole whose peak 41a has a curvature radius R2 smaller than the curvature radius of the arc-shaped protrusion is positioned like a bank along the horizontal direction of the housing. The structure thereof has an angled cross section forming oblique surfaces 41b and 41c bounded by the peak 41a in an opposite direction to each other.

The concave lock portion 40 is lengthened from the lower oblique surface 41c of the locking protrusion 41, being shaped like an arc whose curvature radius R3 is approximately equal to the curvature radius R1 of the arc-shaped protrusion 62 of the hooking piece 60.

When an operator presses the lid portion 14 downward to change the state of the housing from the open lid state into the closed lid state, the arc-shaped protrusion 62 of the hooking piece 60 slides with touching the upper oblique surface 41b of the locking protrusion by the aid of the leaf spring portion 61. As shown in FIG. 5, the lid portion 14 receives a force P1 thrusting it back upward until the arc-shaped protrusion 62 arrives at the peak 41a, so that the lid portion jumps upward if the operator takes off his/her hand therefrom. The reason is that the reaction force fr1 of the arc-shaped protrusion 62 at the contact surface thereof with the oblique surface 41b acts in the direction perpendicular to the oblique surface whereas the leaf spring portion 61 gives the arc-shaped protrusion 62 a force f1 in approximately horizontal direction.

When the arc-shaped protrusion 62 reaches the lower side oblique surface 41c after having passed the peak 41a, the lid portion 14 receives a downward force P2 due to the force f1 and the reaction force fr2, so that the arc-shaped protrusion 62 gets to the concave lock portion 40 even if the operator takes off his/her hand therefrom, and consequently the lid becomes in the closed state. The same action is also carried out when the lid is being opened. Though the dead point vanishes if both the curvature radii of the arc-shaped protrusion 62 and the locking protrusion 41 are decreased to sharpen, considerable effect can be obtained only by decreasing one of the curvature radii, and additionally abrasion thereof can be more diminished than the case where both curvature radii are decreased.

As mentioned above, the lid portion 14 takes two states, i.e. either the open lid state or the closed lid state when the lid portion opens or closes. In the closed lid state, the switch pressing member 58 is inserted into the aperture 42 for the switch of the housing 13 to press the push button 43 of the power switch, and then turns on the power source. In consequence, the power source is never turned on unless the lid portion 14 takes the closed lid state completely. Accordingly, because the power source can be turned on only if the closed lid state is firmly secured after a memory card is inserted into the memory card loading slot 11 or 12, the card in operation is never removed carelessly or the power source is never turned on or off if the lid is incompletely opened, so that information in the memory card is never damaged.

Furthermore, the hooking piece 60 of the lid portion, the concave lock portion 40 and the locking protrusion 41 of the housing portion can be formed together by integral molding of resin when the lid portion and the top housing portion are formed. Therefore number of parts can be so reduced that manufacturing cost can be decreased.

SECOND EMBODIMENT

Figure 6:
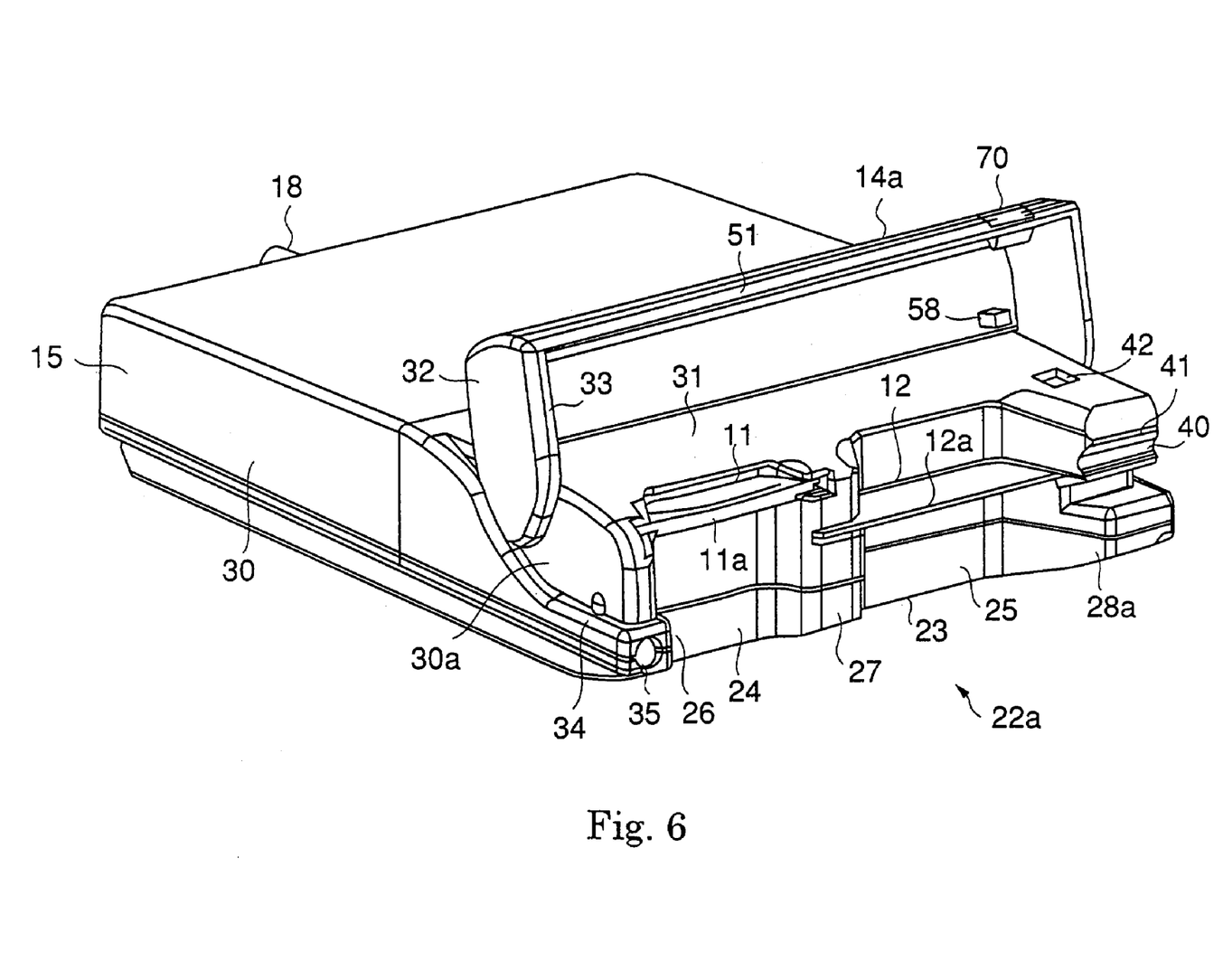
FIG. 6 is a perspective view of the second embodiment of the present invention in the open lid state.
Figure 7A:
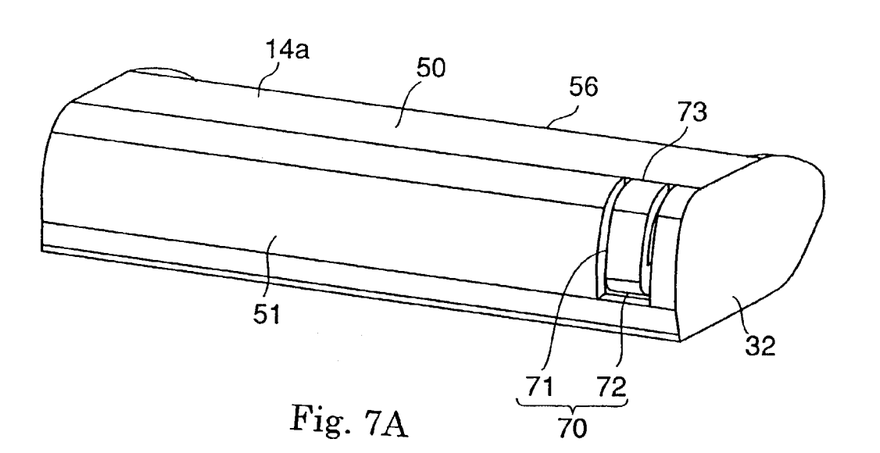
FIG. 7A is a front perspective view to show the lid of the second embodiment of the present invention and FIG. 7B is a perspective view of the rear surface to show the lid of the second embodiment of the present invention.
Figure 7B:
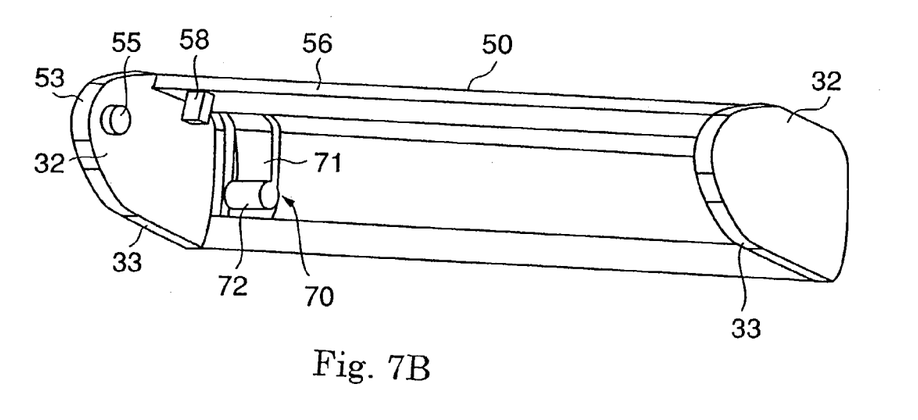

This embodiment is characterized in that a part of the front end of the lid portion is formed as a hooking piece. Referring to FIG. 6 and FIG. 7, explanation will be carried out hereinafter. Each part denoted by the same mark as the first embodiment represents the same part of the first embodiment.

On the front part 22a of the housing portion, memory card insertion slots 11a and 12a corresponding to two kinds of cards are located at a different height from the bottom 23 of the housing and also shifted horizontally to each other. To facilitate insertion of cards, recesses 24 and 25, which make easy for an operator to pinch a card with his/her fingers and thumb, are formed at the front part near the center of each slot. Thus projecting parts 26, 27, and 28 are to be formed on the front part 22a, interposing the two recesses 24 and 25, and intervening between them.

The lid portion 14a is located on the front part of the top housing 15. Therefore, the projecting parts 26, 27, and 28a, both side ends 30, and the top surface portion 31 of the front part are retracted from the outline of the main housing body by approximately the thickness of the lid portion 14, in order that the lid portion may not stick out from the main housing body 13 when the lid is in the closed state, thereby the lid portion 14a is substantially on the same plane as the housing portion 13 to be able to assure a smooth outline when the lid is in the closed state. A contact edge 34 with which the lower edge 33 of the side end 32 of the lid comes into contact is formed on the retracted side end 30a of the top housing 15, to settle the position of the lid portion when the lid is closed. A through hole 35 is formed under the left side projecting part 26 of the front part 22a of the housing, and a light-emitting element (not shown) emitting a light when the power is on and the card is working is located in the through hole.

A concave lock portion 40 and a locking protrusion 41 are formed on the right side projecting part 28a of the front part 22a of the housing portion. Positions where the concave lock portion 40 and the locking protrusion 41 are formed are projected toward the front of the main housing body compared to the first embodiment, and come into contact with the lid 14a. An aperture 42 for the switch is formed slightly behind the projecting part 28a on the top surface portion 31 of the top housing, and a push button 43 of the power switch 21 of the main body is located inside the aperture.

The lid portion 14 is provided with the top surface portion 50 and the front end portion 51, and a lid side end portion 32 is located at each side end of the lid portion. The lid side end portion 32 is elongated backward more than the top surface 50, and an axial protrusion 55 is projecting inside the rear end of the lid edge 53 i.e. each lid side end portion. Through-hole socket (not shown) extending downward from the top surface 31 of the housing is formed in the retracted side edge 30a of the top housing. The lid portion 14a is pivotally mounted on the housing portion 13 in such a manner as to turn freely thereon, by inserting the axial protrusion 55 into the through-hole socket. The turning range of the lid portion 14a is up to the position where the rear edge 56 of the top surface 50 of the lid portion comes into contact with the top surface 31 of the housing portion when the lid is open, and up to the position where the lower edge 33 of the lid side end 32 comes into contact with the contact edge 34 of the top housing when the lid is closed.

As shown in FIGS. 7A and 7B, the hooking piece 70 comprising the leaf spring portion 71 and the arc-shaped protrusion 72 formed on the top of the spring portion is located at the right side of the front end 51 of the lid portion 14a, viewed from the front side 22a of the housing, with a part of the front end 51 being cut out. The front end 51 shapes a curved surface so as to be a part of a cylinder. The leaf spring portion 71 is formed along the front end 51, and the base end 73 thereof is secured to the top part 50 of the lid portion 14a. In other words, the hooking piece 70 combines a part of the surface of the lid 14a, so that it can be formed integrally together with the lid when the lid is fabricated by resin molding.

The leaf spring portion 71 curves along the direction of the outside of the lid, and the arc-shaped protrusion 72 is projecting inward. The leaf spring portion 71 gets stuck with the concave lock portion 40 and the locking protrusion 41 formed on the projecting part 28a of the housing, in order to secure the stable closed lid state by the function explained in the first embodiment.

The switch pressing member 43 located behind the hooking piece on the rear surface of the lid 14a is formed like a rectangular pole, pressing the push button 43 of the power switch 21 by being inserted into the aperture 42 for the switch on the top surface 31 of the top housing when the lid is in the closed state.

This embodiment has an advantage that possibility of breaking the hooking piece caused by hooking it improperly is lowered thanks to the hooking piece 70 being in the front end of the lid. Furthermore, number of the resin mold parts of the lid is small, so that manufacturing cost thereof can be decreased.

Although the present invention was explained by the embodiments as mentioned above, it is needless to say that varieties of modifications can be allowed within the range of the invention. For example, the card loading slot can be changed to a loading slot for a medium other than cards. Moreover, pluralities of the hooking pieces can be formed. Though the spring portion of the hooking piece was bent along the turning direction of the lid in the embodiments mentioned above, it can also be formed linearly. Additionally, the switch pressing member may be formed in any other shapes, e.g. a cylinder, other than the rectangular pole.

Because the present invention makes the lid be in two states i.e. the open state or the closed state, not in any intermediate states to the housing by the aid of the function of the hooking piece provided on the lid and the concave lock portion and the locking protrusion provided on the housing, the switch can be surely operated in the closed state and insertion of the card can be assured with the lid closed. Furthermore, the invention can provide regular operation of the card and the electronic device.

What is claimed is:

1. A card interface device comprising:
   a main housing body having an opening portion,
   a lid portion mounted on the main housing body in such a manner as to turn freely thereon to open or close the opening portion,
   a concave lock portion and a locking protrusion located adjacent to the concave lock portion, both of which are provided on the side of the opening portion of the main housing body in order to be able to lock the lid portion in the closed state, and
   a hooking piece provided on the lid portion and comprising a spring portion in a shape of a plate with a predetermined width and an arc-shaped protrusion formed at an end of the spring portion,
   wherein the lock protrusion has a greater curvature than a curvature of the arc-shaped protrusion, and the arc-shaped protrusion comes into contact with the locking protrusion and the concave lock portion under pressure by the aid of the spring portion when the lid portion is turning to open or close the opening portion, and receives a force opposing the turning direction before and after it passes through the locking protrusion to prevent from forming a dead point on a top of the lock protrusion.

2. The card interface device as stated in any of claim 1, wherein the hooking piece is integrally formed on the rear surface of the top surface portion of the lid portion.

3. The card interface device as stated in any of claim 1, wherein the hooking piece is formed on the front edge part of the lid portion.

4. The card interface device as stated in any of claim 1, wherein the curvature of the concave lock portion is approximately the same as the curvature of the arc-shaped protrusion.

5. A card interface device comprising:
   a main housing body having at least one card loading portion at the front part thereof and accommodating therein a circuit board containing a switch, and forming an aperture for the switch through which the switch is exposed,
   a lid portion mounted on the main housing body in such a manner as to turn freely thereon to open or close the card loading portion,
   a concave lock portion and a locking protrusion located adjacent to the concave lock portion along a parallel direction of the card loading portion, both of which are provided on the side of the card loading portion of the main housing body in order to be able to lock the lid portion in the closed state,
   a hooking piece provided on the lid portion and comprising a spring portion in a shape of a plate with a predetermined width and an arc-shaped protrusion formed at an end of the spring portion, and
   a switch pressing member provided at the side of the lid portion facing the aperture for the switch of the main housing body corresponding to the aperture for the switch,
   wherein the lock protrusion has a greater curvature than a curvature of the arc-shaped protrusion, the arc-shaped protrusion comes into contact with the locking protrusion and the concave lock portion under pressure by the aid of the spring portion when the lid portion is turning to open or close the opening portion, and receives a force opposing the turning direction before and after it passes through the locking protrusion to prevent from forming a dead point on a top of the lock protrusion, and the switch pressing member presses the switch by being inserted into the aperture for the switch when the lid is closed.

6. The card interface device as stated in any of claim 5, wherein the hooking piece is integrally formed on the rear surface of the top surface portion of the lid portion.

7. The card interface device as stated in any of claim 5, wherein the hooking piece is formed on the front edge part of the lid portion.

8. The card interface device as stated in any of claim 5, wherein the curvature of the concave lock portion is approximately the same as the curvature of the arc-shaped protrusion.

9. The card interface device as stated in claim 5, wherein the switch pressing member, the concave lock portion and the locking protrusion are all together positioned offset on the same side of the lid portion.

10. The card interface device as stated in claim 5, wherein two card loading portions are located side by side to each other.

* * * * *